Dec. 5, 1967    J. H. CASTOE    3,355,791
TOOL FOR BRAKE SHOE HOLD DOWN SPRINGS
Filed Sept. 20, 1965    2 Sheets-Sheet 1
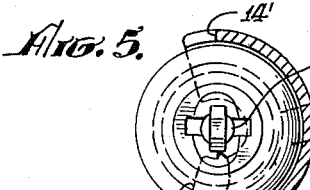
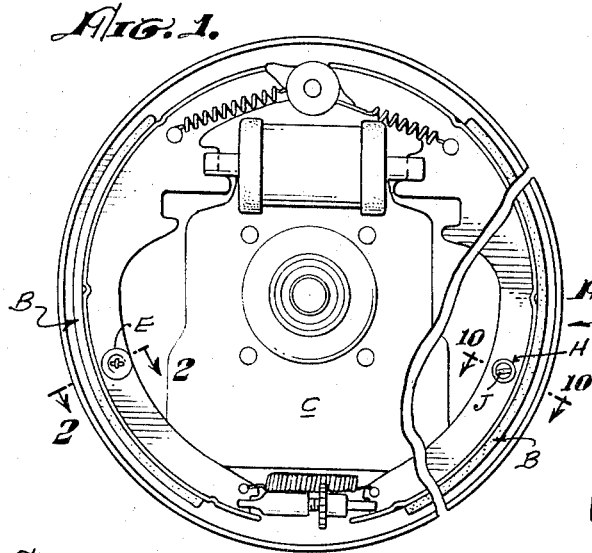
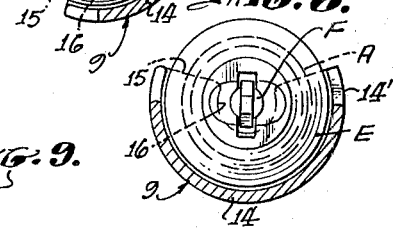
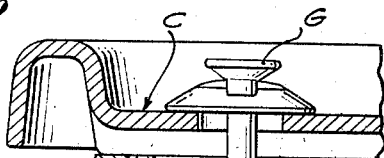
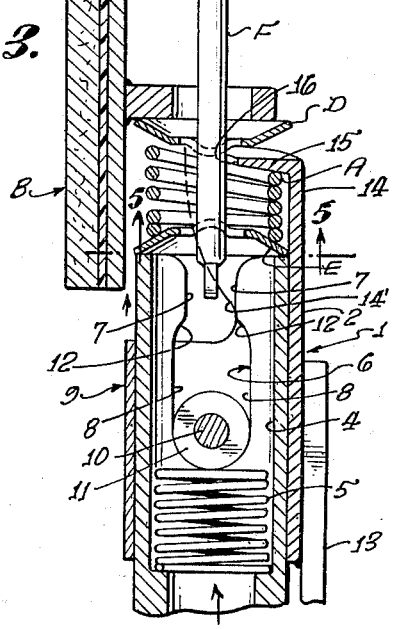
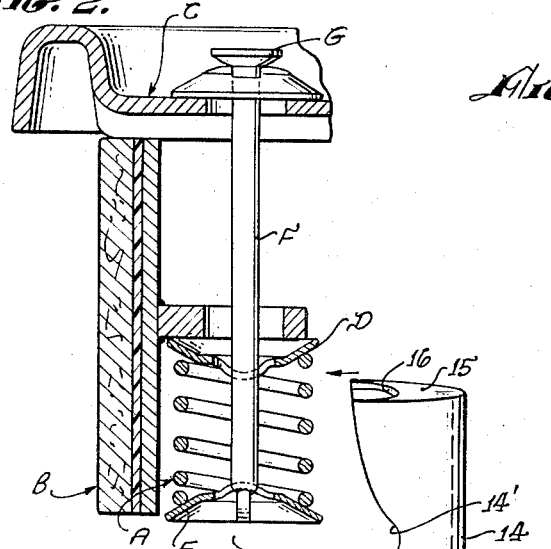
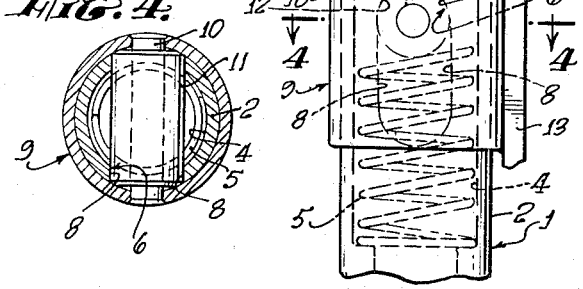
INVENTOR.
JOHN H. CASTOE,
By Harold J. DeVesconte
ATTORNEY.

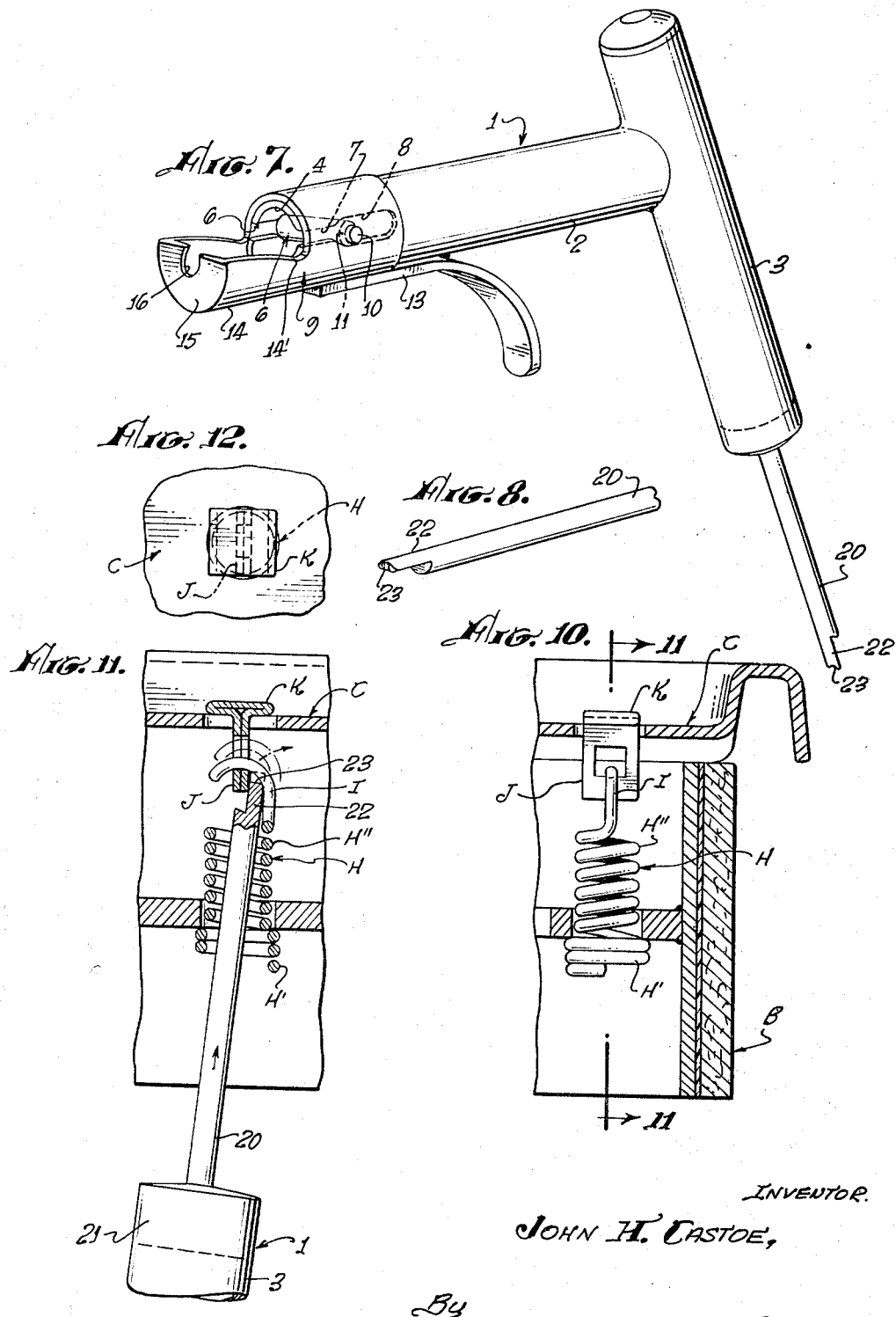

United States Patent Office 3,355,791
Patented Dec. 5, 1967

3,355,791
TOOL FOR BRAKE SHOE HOLD DOWN SPRINGS
John H. Castoe, 6438 Foothill Blvd.,
Tujunga, Calif. 91042
Filed Sept. 20, 1965, Ser. No. 488,508
3 Claims. (Cl. 29—227)

ABSTRACT OF THE DISCLOSURE

A tool for installing and removing compression type automobile brake shoe hold down springs comprising an L-shaped body affording a pistol type grip and a spring biased, manually operable means on the "barrel" end of said body operable to engage both ends of a compression type hold down spring and momentarily compress it sufficiently to permit ready engagement and disengagement of the associated pin by which the spring and brake shoe are connected to the mounting plate therefor.

---

This invention relates to automobile brake service and replacement work and more particularly to a tool for removing and installing the hold down springs which yieldably hold the brake shoes against lateral movement on the supporting means therefor while freely permitting the expansion and retracting movements of the brake shoes.

The brake shoes associated with automobile wheels are yieldably mounted against a non-rotating supporting plate carried by the axle means for the wheels so as to have the necessary expansion and contracting movements incident to the braking action and some limited extent of movement axially of the wheel to accommodate themselves to the brake drum surface. One usual means for thus yieldably holding each of the brake shoes against excessive lateral movement comprises a pin loosely extending through an opening in the brake shoe supporting plate and through a corresponding large hole in the brake shoe center rib and engaging a preloaded compression spring reacting between washer means seated on the pin and on the opposed face of the brake shoe rib. Heretofore, the replacement of the hold down springs has been a tedious and difficult operation because of the limited space available to the mechanic and the fact that he has been required to try to coordinate the holding of some three or four different parts, one of which was a spring which was subjected to stress incident to installation and removal.

Having these considerations in mind, the present invention has for its principal objective the provision of a hand tool for quickly and easily removing and replacing brake shoe hold down springs of the compression type.

Another object of the invention is to provide a tool of the above character in which a compression type brake shoe hold down spring may be placed in prestressed condition for installation and released from such condition when installed.

A further object of the invention is to provide a brake shoe hold down spring removing and installing tool which is capable of one hand operation leaving the other hand of the user free to manipulate the part with which the spring is to be connected or disconnected.

With the foregoing objects in view, together with such additional objects and advantages as may subsequently appear, the invention resides in the parts and in the construction, combination and arrangement of parts described, by way of example, in the following specification of a presently preferred embodiment of the invention, reference being had to the accompanying drawings which form a part of said specification and in which drawings:

FIG. 1 is a side elevational view of the open side of a vehicle wheel brake drum showing a pair of brake shoes therein and showing one of the forms of brake shoe hold down springs for which the present invention is intended, FIG. 2 is a greatly enlarged, transverse section taken on the line 2—2 of FIG. 1, showing the brake shoe as assembled and showing the tool ready to be applied to remove the spring, FIG. 3 is a view like FIG. 2 but showing the tool of the invention applied and compressing the hold down spring, FIG. 4 is a transverse section on the line 4—4 of FIG. 2, FIGS. 5 and 6 are transverse sections on the line 5—5 of FIG. 3 and showing a mode of use of the tool in effecting relative rotative movement between the spring securing pin and the washer associated with the hold down spring for removal or installation of a compression type spring, FIG. 7 is a perspective view of the tool, FIG. 8 is a fragmentary perspective view of the spring engaging element used in connection with the installation and removal of tension type brake shoe hold down springs, FIG. 9 is a fragmentary view associated with FIG. 1 showing the mode of use of a tension type of hold down spring, FIG. 10 is a greatly enlarged, transverse sectional view taken on the line 10—10 of FIG. 9 showing a tension type of hold down spring as installed, FIG. 11 is a view like FIG. 10 but showing the tool of the present invention as employed either in engaging or disengaging a tension type brake shoe hold down spring, and FIG. 12 is a rear elevational view of the plate on which the brake shoe is mounted showing the rear face of the clip with which the tension type of hold down spring is connected.

Referring first to FIGS. 1, 2 and 3, there is shown the compression type of brake shoe hold down spring A operating to hold a brake shoe B yieldably against a side surface of a mounting plate C, said spring having one end resting on the exterior of a coned washer D which engages the side of the center rib of the brake shoe and the other end engaging the exterior of a coned washer E having an elongated slot at its center. The spring is held in compressed condition by a pin F having a head G engaging a washer on the side of the plate C opposite the side engaged by the brake shoe, said pin thence extending through an opening in the brake shoe rib and the spring and terminating in a widened flattened head which may be inserted through the slot in the washer E and locked therein by being turned to a position out of registry with the slot.

The tension type of hold down spring is shown in FIGS. 9, 10 and 11, it being noted that FIG. 9 is shown as though it were a fragment of FIG. 1, it appearing to be unnecessary for an understanding of the invention to show all of the details of a pair of brake shoes associated with each type of hold down spring and it being understood that in any automobile, the four pairs of brake shoes would be equipped with identical hold down springs. Specifically, the tension type of hold down spring comprises a close wound helical spring H having a larger diameter portion H' at one end and a smaller diameter body portion H" terminating in a hook I engageable with the eye portion J of a clip element K which extends through a hole in the mounting plate C, the head L of said clip being sufficiently large to serve as an anchoring means and the body portion H" of the spring extending through a hole in the center rib of the brake shoe B while the large portion H' thereof serves to anchor the spring therein, the length of the spring body H" being such that engagement of the hook I with the clip K extends the spring from its normal close wound configuration thus creating a bias yieldably holding the brake shoe B against the mounting plate C.

The illustrated embodiment of the invention as shown in FIG. 7 comprises a body 1 formed of two metal tubing members united together and including a spring manipulating member 2 and a handle member 3, the end of the member 2 being welded to the side surface of the member 3 adjacent one end of the latter in a substantially L-shape configuration, the diameter of the tubing being preferably at least as large as the diameter of the compression type of hold down spring and the length of each of the members being such that either one may be used as a pistol type grip for the manipulation of spring engaging instrumentalities disposed at the opposite distal ends of the tubing members.

The distal end of the member 2 is counterbored as at 4 to form a clearance and seat for a compression spring 5 housed therein and outwardly from the bottom of said counterbore the side walls of the member 2 are provided with diametrically opposite slots 6, 6 extending as narrow slots 7, 7 at the outer end thereof and inwardly therefrom being widened as at 8, 8. A spring coil engaging member includes a sleeve 9 which is slidable on the distal end of the member 2 and a cross pin 10 extending between opposite sides of the sleeve supports a roller 11 which engages the wider portions 8, 8 of the slot and serves as an abutment which the outer end of the spring 5 reacts tending constantly to urge the sleeve and roller to the outward extent of movement determined by engagement of the ends of the roller with the shoulders 12 formed by the juncture of the narrow and wide portions of the slots. The outer surface of the sleeve 9 at the side thereof adjacent the longer end of the body member 3 carries a handle 13 comprising a trigger-like extension positioned and adapted to be engaged at least by the forefinger of the hand holding the member 3 to move the sleeve inwardly against the bias of the spring 5 to the extent determined by the engagement of the roller 11 with the inner ends of the slot portions 8, 8.

The spring coil and engaging member 9 also includes a semicircular extension portion 14 formed integrally with the sleeve 9 which projects beyond the distal end of the body member 2 and terminates in a spring coil engaging end wall portion 15, which when the sleeve is projected forward to the extent permitted by the engagement of the roller 11 with the shoulders 12, is positioned beyond the end of the body member a distance which is substantially equal to the length of the hold down spring A in its position of use. The end wall portion 15 is preferably disposed at a helical angle substantially equal to the lead of the hold down spring A and is formed with a clearance 16 at the axial line of the sleeve 9 which is generated about said axial line at a radius equal to the greatest radial dimension of the flattened head of the pin F.

Referring now principally to FIGS. 2 and 3, the mode of use of the first embodiment of the invention is shown. Assuming that a brake shoe B is to be removed, incident to such removal, the spring A must be removed. For this purpose, the tool is moved alongside of the spring as shown in FIG. 2 and is moved laterally to a position in which the spring is received within the recess formed by the sleeve extension 14 and the end of the member 3 with the end wall 15 entering between the outermost coils of the spring A and adjacent to the washer D and with the body of the pin F being received in the clearance cut 16. Then the mechanic can reach in back of the plate C and hold the pin F and by pulling back on the handle 13 and pressing inwardly on the tool, can compress the spring A as shown in FIG. 3. The pin F or the spring A and the tool can now be rotated relative to each other until the flattened head of the pin F is in registry with the slot in the washer E at which time the spring and washer can be removed as a unit and left in the tool until ready to be replaced or they can be taken out of the tool to enable the tool to be used elsewhere. Preferably, the side walls of the extension 14 are relieved as at 14' to facilitate observation of the relative positions of the head of the pin and the slot in the washer. Replacing the spring and washer is equally readily accomplished. The washer E is first placed in the tool with the convex side thereof outermost and the spring is then inserted in the recess at the end of the tool, the helical lead of the end wall 15 permitting the spring to be rotated and thus screw itself into the tool socket or recess. The sleeve is then retracted by the handle 13 to compress the spring and the collapsed spring is placed over the pin F, the flattened head of the pin inserted through the slot in the washer E and the tool and washer on the pin rotated until the flattened head of the pin is at substantially right angles to the slot in the washer E after which the tool can be released and removed. Since the spring and washer are held in proper relative position to each other in the tool, and since the tool thus holding the spring and washer can be held and manipulated by one hand, the mechanic is free to employ the other hand to steady the pin F and cause it to enter the slot in the washer E and then assist to effect relative rotation between the pin and the tool and washer.

Referring finally to FIGS. 8, 10, 11 and 12, the tool body member 3 at the distal end thereof is provided with a small cylindrical shank 20 carried by a head element 21 inserted and brazed or otherwise secured in the body member 3, said cylindrical member at its distal end being reduced in thickness from one side thereof for approximately one-half of the diameter thereof forming a semicircular blade portion 22, the diameter of the shank 20 being such as will freely fit inside of the tension spring portion H″ as best shown in FIG. 11. The distal end of the blade 22 is provided with a notch 23 adapted to straddle the hook portion I of the spring H so that by endwise pressure on the tool, the spring H can be extended sufficiently to cause the hook I to be engaged with or disengaged from the clip K, the operator using one hand to manipulate the tool itself and the other hand to hold the clip K in position for engagement or disengagement with the spring.

It is particularly to be noted that the tool is so arranged that one portion of the tool body 1 serves as a handle for the use of the tool with the instrumentality carried by the other member of the body portion so that the mechanic does not need two separate operations but has only a single tool which he can employ for either type of hold down spring as he may be called upon to service.

While in the foregoing specification there has been disclosed a presently preferred embodiment of the invention, such disclosure has been by way of example and it will be understood that the invention is not limited to the precise details of construction so disclosed and includes as well all such changes and modifications in the parts and in the construction, combination and arrangement of parts as shall come within the purview of the appended claims.

I claim:

1. A tool for removing and installing compression type automobile brake shoe hold down springs comprising a body including two tubular members united in a substantially L-shaped configuration and including a spring manipulating member and a handle member, the distal end of said manipulating member terminating in an annular, spring washer engaging end face, a cooperating spring coil engaging member slidably mounted on said distal end and terminating in a spring coil engaging face opposed to and spaced from said end face of said spring manipulating member, said coil engaging face being of less than a complete circle in extent, compression spring means interposed between said spring manipulating member and spring coil engaging member normally operative to move said spring coil engaging member to increase the distance between said faces, stop means limiting the extent to which said spring means may move said spring coil engaging member, and a handle means on said spring coil engaging member affording means for engagement by the hand of the user holding said handle portion to simultaneously move said spring coil engaging member against the bias of said spring means with resultant compression of a brake shoe hold down spring and a locating washer therefor contained between said faces.

2. A spring removing and installing tool as claimed in claim 1 in which the distance between said faces when limited by said stop means is less than the unstressed length of a brake shoe hold down spring to be installed or removed by said tool.

3. A spring installing and removing tool as claimed in claim 1 in which said coil engaging face of said spring engaging member is disposed at a helical angle substantially equal to the helical angle of a spring engaged thereby.

References Cited

UNITED STATES PATENTS

| | | | |
|---|---|---|---|
| 1,468,526 | 9/1923 | Terroine | 29—227 X |
| 2,490,160 | 12/1949 | Riccio | 29—227 |
| 2,529,599 | 11/1950 | Dick | 29—227 |
| 2,811,772 | 11/1957 | Johnson | 29—227 |

OTHELL M. SIMPSON, *Primary Examiner.*

J. C. PETERS, *Assistant Examiner.*